US008375351B2

(12) United States Patent
Ahadian et al.

(10) Patent No.: US 8,375,351 B2
(45) Date of Patent: Feb. 12, 2013

(54) EXTENSIBLE RAPID APPLICATION DEVELOPMENT FOR DISPARATE DATA SOURCES

(75) Inventors: Azadeh Ahadian, San Jose, CA (US); Stephen Andrew Brodsky, Los Gatos, CA (US); Anshul Dawra, San Jose, CA (US); Vasantha Jayakumar, Fremont, CA (US); Rebecca B. Nin, Morgan Hill, CA (US); Michael Leon Pauser, Morgan Hill, CA (US); Michael Schenker, San Jose, CA (US); Sonali Surange, San Rafael, CA (US); Daya Vivek, San Jose, CA (US); Maryela Evelin Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/767,497

(22) Filed: Jun. 23, 2007

(65) Prior Publication Data
US 2008/0320441 A1 Dec. 25, 2008

(51) Int. Cl.
*G06F 9/44* (2006.01)
(52) U.S. Cl. ............... 717/101; 717/106; 717/107
(58) Field of Classification Search .......... 717/107, 717/108, 121, 106
See application file for complete search history.

(56) References Cited

U.S. PATENT DOCUMENTS

| | | | |
|---|---|---|---|
| 5,675,801 A * | 10/1997 | Lindsey | 717/108 |
| 5,701,400 A | 12/1997 | Amando | |
| 5,754,858 A * | 5/1998 | Broman et al. | 717/111 |
| 5,897,949 A | 4/1999 | Luhmann et al. | |
| 6,006,224 A | 12/1999 | McComb et al. | |
| 6,240,417 B1 | 5/2001 | Eastwick et al. | |
| 6,298,342 B1 | 10/2001 | Graefe et al. | |
| 6,341,288 B1 * | 1/2002 | Yach et al. | 1/1 |
| 6,353,820 B1 | 3/2002 | Edwards et al. | |
| 6,446,256 B1 | 9/2002 | Hyman et al. | |
| 6,473,768 B1 | 10/2002 | Srivastava et al. | |
| 6,496,833 B1 | 12/2002 | Goldberg et al. | |
| 6,507,834 B1 | 1/2003 | Kabra et al. | |
| 6,591,272 B1 * | 7/2003 | Williams | 1/1 |
| 6,594,653 B2 | 7/2003 | Colby et al. | |
| 6,629,094 B1 | 9/2003 | Colby et al. | |
| 6,658,426 B1 * | 12/2003 | Poskanzer | 1/1 |

(Continued)

FOREIGN PATENT DOCUMENTS

| EP | 1251423 | 10/2002 |
|---|---|---|
| EP | 1251423 A2 | 10/2005 |

OTHER PUBLICATIONS

Charles Z. Mitchell, "Engineering VAX Ada for a Multi-Language Programming Environment", ACM SIGSOFT/SIGPLAN software engineering symposium on Practical software development environments, 1987, pp. 49-58.

(Continued)

*Primary Examiner* — Phillip H Nguyen
(74) *Attorney, Agent, or Firm* — Patterson & Sheridan, LLP

(57) ABSTRACT

Embodiments of the invention provide an IDE tool that provides rapid application development features for a variety of disparate data sources. Further, developers may customize and extend the rapid application development features to suit their development needs in a particular case. In a particular embodiment, the rapid application development template may be configured to generate a set of configuration files localized used to deploy a "lightweight" application, such as a web-service, to a particular application server.

25 Claims, 6 Drawing Sheets

U.S. PATENT DOCUMENTS

| | | | |
|---|---|---|---|
| 6,799,184 | B2 | 9/2004 | Bhatt et al. |
| 6,799,718 | B2 | 10/2004 | Chan et al. |
| 7,047,518 | B2 | 5/2006 | Little et al. |
| 7,054,924 | B1* | 5/2006 | Harvey et al. ............ 709/220 |
| 7,072,983 | B1 | 7/2006 | Kanai et al. |
| 7,076,772 | B2 | 7/2006 | Zatloukal |
| 7,086,009 | B2* | 8/2006 | Resnick et al. ............ 715/771 |
| 7,107,578 | B1 | 9/2006 | Alpern |
| 7,110,936 | B2* | 9/2006 | Hiew et al. ............ 703/22 |
| 7,137,100 | B2 | 11/2006 | Iborra et al. |
| 7,240,340 | B2 | 7/2007 | Vaidyanathan et al. |
| 7,350,192 | B2 | 3/2008 | Seitz et al. |
| 7,421,680 | B2 | 9/2008 | DeLine et al. |
| 7,516,128 | B2 | 4/2009 | Colby et al. |
| 7,539,973 | B2 | 5/2009 | Hodge |
| 7,650,592 | B2 | 1/2010 | Eckels et al. |
| 7,665,058 | B2 | 2/2010 | Vogel et al. |
| 7,681,176 | B2* | 3/2010 | Wills et al. ............ 717/109 |
| 7,685,194 | B2 | 3/2010 | Kabra et al. |
| 7,689,614 | B2 | 3/2010 | de la Iglesia et al. |
| 7,707,550 | B2* | 4/2010 | Resnick et al. ............ 717/121 |
| 7,725,460 | B2 | 5/2010 | Seitz et al. |
| 7,756,850 | B2 | 7/2010 | Keith, Jr. |
| 7,761,443 | B2 | 7/2010 | Bhaghavan et al. |
| 7,774,333 | B2 | 8/2010 | Colledge et al. |
| 7,788,085 | B2 | 8/2010 | Brun |
| 7,792,836 | B2 | 9/2010 | Taswell |
| 7,792,851 | B2 | 9/2010 | Berg et al. |
| 7,797,303 | B2 | 9/2010 | Roulland et al. |
| 7,801,882 | B2 | 9/2010 | Cunningham et al. |
| 8,090,735 | B2 | 1/2012 | Bireley et al. |
| 8,095,823 | B2* | 1/2012 | Griffith et al. ............ 714/16 |
| 2002/0016953 | A1* | 2/2002 | Sollich ............ 717/1 |
| 2002/0059444 | A1 | 5/2002 | Shinno |
| 2002/0156772 | A1 | 10/2002 | Chau et al. |
| 2002/0178434 | A1 | 11/2002 | Fox et al. |
| 2003/0004979 | A1 | 1/2003 | Woodring |
| 2003/0041052 | A1 | 2/2003 | Gajda et al. |
| 2003/0074358 | A1 | 4/2003 | Sarbaz et al. |
| 2003/0172076 | A1 | 9/2003 | Arnold et al. |
| 2003/0200212 | A1 | 10/2003 | Benson et al. |
| 2003/0229885 | A1* | 12/2003 | Gownder et al. ............ 717/115 |
| 2004/0003371 | A1 | 1/2004 | Coulthard et al. |
| 2004/0044687 | A1* | 3/2004 | Vachuska et al. ............ 707/104.1 |
| 2004/0064788 | A1* | 4/2004 | Gownder et al. ............ 715/513 |
| 2004/0078470 | A1 | 4/2004 | Baumeister et al. |
| 2004/0267690 | A1 | 12/2004 | Bhogal et al. |
| 2005/0027702 | A1 | 2/2005 | Jensen et al. |
| 2005/0091366 | A1* | 4/2005 | Acharya ............ 709/224 |
| 2005/0114771 | A1 | 5/2005 | Piehler et al. |
| 2005/0120014 | A1 | 6/2005 | Deffler |
| 2005/0160104 | A1 | 7/2005 | Meera et al. |
| 2005/0182758 | A1 | 8/2005 | Seitz et al. |
| 2005/0210374 | A1* | 9/2005 | Lander ............ 715/513 |
| 2005/0229154 | A1* | 10/2005 | Hiew et al. ............ 717/110 |
| 2005/0256852 | A1 | 11/2005 | McNall et al. |
| 2005/0256907 | A1 | 11/2005 | Novik et al. |
| 2005/0262046 | A1 | 11/2005 | Day et al. |
| 2005/0278270 | A1 | 12/2005 | Carr et al. |
| 2006/0020619 | A1 | 1/2006 | Netz et al. |
| 2006/0020933 | A1 | 1/2006 | Pasumansky |
| 2006/0041864 | A1 | 2/2006 | Holloway et al. |
| 2006/0075120 | A1 | 4/2006 | Smit |
| 2006/0085400 | A1 | 4/2006 | Minore et al. |
| 2006/0112067 | A1 | 5/2006 | Morris |
| 2006/0156286 | A1 | 7/2006 | Morgan et al. |
| 2006/0179027 | A1 | 8/2006 | Bechtel et al. |
| 2006/0236304 | A1 | 10/2006 | Luo et al. |
| 2006/0242077 | A1 | 10/2006 | Dettinger et al. |
| 2006/0248045 | A1 | 11/2006 | Toledano et al. |
| 2007/0011651 | A1 | 1/2007 | Wagner |
| 2007/0044066 | A1 | 2/2007 | Meijer et al. |
| 2007/0050348 | A1 | 3/2007 | Aharoni |
| 2008/0162445 | A1 | 7/2008 | Ghazal |
| 2008/0172360 | A1 | 7/2008 | Lim et al. |
| 2008/0189240 | A1 | 8/2008 | Mullins et al. |
| 2008/0222129 | A1 | 9/2008 | Komatsu et al. |
| 2008/0270343 | A1 | 10/2008 | Brodsky |
| 2008/0270980 | A1 | 10/2008 | Ahadian et al. |
| 2008/0270983 | A1 | 10/2008 | Ahadian et al. |
| 2008/0270989 | A1 | 10/2008 | Ahadian et al. |
| 2008/0320013 | A1 | 12/2008 | Bireley et al. |

OTHER PUBLICATIONS

Thomas C. Hartrum and Robert P. Graham, Jr., "The AFIT Wide Spectrum Object Modeling Environment: An Awsome Beginning", Proceedings of the IEEE 2000 National Aerospace and Electronics Conference, pp. 35-42, Oct. 10-12, 2000.

Robert A. Ballance et al., "The Pan Language-Based Editing System for Integrated Development Environments", SIGSOFT'90 Proceedings of the Fourth ACM SIGSOFT Symposium on Software Development Environments, Dec. 3-5, 1990, pp. 77-93, vol. 15 No. 6, Irvine, California.

Maarit Harsu et al., "A Language Implementation Framework in Java", Object-Oriented Technology, ECOOP'97 Workshop Reader, Lecture Notes in Computer Science, Jun. 9-13, 1997, pp. 141-144, vol. 1357, Jyvaskyla, Finland.

Azadeh Ahadian et al., "Rapid Application Development for Database-Aware Applications", U.S. Appl. No. 11/741,644, filed Apr. 27, 2007.

William R. Bireley et al., "Statement Generation Using Statement Patterns", U.S. Appl. No. 11/767,454, filed Jun. 22, 2007.

PCT International Search Report & Written Opinion for PCT/EP2008/053916, dated Oct. 13, 2008.

DB Solo: The Ultimate Database Tool, 26 pages, <http://web.archive.org/web/20070203195407/http://dbsolo.com/help/DBSolo.html>, 2007.

Ahadian, Azadeh et al., Understanding pureQuery, Part 1: pureQuery: IBM's new paradigm for writing Java database applications, Dec. 14, 2007, <http://www.ibm.com/developerworks/data/library/techarticle/dm-0708ahadian/>.

Liberty, Jesse, Chapter 5. Data, Visual C# 2005: A Developer's Notebook, Apr. 2005, O'Reilly Media, Inc., Sebatopol, CA, United States.

Kurniawan, Budi, Chapter 15. The Persistence Layer, Struts Design and Programming: A Tutorial, Apr. 1, 2005, BrainySoftware, Markham, Ontario, Canada.

"Eclipse Database Explorer—Database browser, SQL editor, ERD Specialized Oracle Connector, JDBC connection templates for all relational databases", Eclipse Database Explorer Plugin :: MyEclipse, Mar. 25, 2006, pp. 1-8.

G. P. Fitzpatrick et al., "Source Code Critical Region Hyper-Data", IBM Technical Disclosure Bulletin, vol. 36, No. 06B, pp. 353-354, Jun. 1993.

Abramson, D. et al. "A Debugging and Testing Tool for Supporting Software Evolution"; Automated Software Engineering, 1996 (vol. 3, pp. 369-390).

Brylow, D. et al.; "Deadline Analysis of Interrupt-driven Software"; Software Engineering Notes, 2003 (vol. 28, pp. 198-207).

Cao et al., "Design and implementation for SQL parser based on ANTLR," 2010 2nd International Conference on Computer Engineering and Technology (ICCET), Apr. 2010, vol. 4: pp. 276-279.

Ghodke et al., "Fast Query for Large Treebanks," HLT '10 Human Language Technologies: the 2010 Annual Conference of the North American Chapter of the Association of Computational Linguistics, Jun. 2010: pp. 267-275.

Kats et al., "The Spoofax Language Workbench," Spash '10 Proceedings of the ACM International Conference Companion on Object Oriented Programming Systems Languages and Applications Companion, 2010: pp. 444-463.

Koch, "A Computational Semantic Approach Applied to Simple Database Queries," IEEE 2003 International Conference on Natural Language Processing and Knowledge Engineering, Oct. 2003, pp. 388-393.

Wu et al., "Integrating Diverse CIM Data Bases: The Role of Natural Language Interface," IEEE Transactions on Systems, Man, and Cybernetics, Nov./Dec. 1992, Vol. 22(6): pp. 1331-1347.

Zhang et al., "Understanding Web Query Interfaces: Best-Effort Parsing with Hidden Syntax," SIGMOD '04 Proceedings of the 2004 ACM SIGMOD International Conference on Management of Data, Jun. 2004: pp. 107-118.

* cited by examiner

EXTENSIBLE RAPID APPLICATION DEVELOPMENT FOR DISPARATE DATA SOURCES

CROSS-REFERENCE TO RELATED APPLICATIONS

This application is related to U.S. patent application Ser. No. 11/741,644, entitled RAPID APPLICATION DEVELOPMENT FOR DATABASE-AWARE APPLICATIONS, filed Apr. 27, 2007, by Azadeh Ahadian et al. This related patent application is herein incorporated by reference in its entirety.

BACKGROUND OF THE INVENTION

1. Field of the Invention

Embodiments of the invention are related to data processing and more particularly to tools used to develop application software.

2. Description of the Related Art

Developing software applications is a complex task, and IDE tools are available to assist computer programmers with the development process. Currently, IDE tools are available to assist programmers developing applications in a variety of programming languages (e.g., Java®.net, C, C++, C#, etc.). These tools are typically configured with features such as auto-indenting, syntax highlighting, type checking, and a variety of other features that assist the development process. Typically, IDE tools are optimized for different programming languages.

One common feature provided by IDE tools is the capability to generate application source code or other project artifacts for a development project (e.g., XML documents, resource files, install scripts, etc.) More specifically, currently available IDE tools may be configured to auto-generate pre-defined types of application source code or artifacts based on a pre-defined set of inputs. For example, frequently, a "wizard" or other interface construct may allow a user to create a new development project as a "console" application or a "windowed" application or allow a user to generate some related artifact such as project documentation (e.g., the Javadoc tool). Similarly, an IDE tool may be configured to create a framework for a web-service or some other application type. In such a case, however, the IDE tool may only be configured to build a generic web-service framework or in some cases a web-service framework localized for a particular application server. One problem with this approach is that developers wish to create an application package that may be used on a variety of commercially available application servers. Thus, even when the IDE tool generates a comprehensive web-service for a given application server, it locks the developer into that application server. To use others, the developer has to either develop multiple versions of their web-service by hand or attempt to modify the one generated by the IDE tool, an ad-hoc and error-prone process at best.

Further, what may be generated by a given IDE tool for a development project is generally limited to what is "hard-wired" into that IDE tool. In other words, it is left to the developer to build most of the application, and at best the available IDE tools may provide various options in the form of user preferences that allow developers to customize what is created by the IDE tool. And even this still requires the developer to have knowledge of the type and extent of customization that is offered by the IDE tool. Importantly, for any new user customizations, IDE tool builders have to release new versions of the IDE tool, developers have to wait (and usually pay) for changes in what code-generation features are included in a given IDE tool. Thus, based on the foregoing limitations in currently available IDE tools, the currently available IDE tools are very rigid in what may be auto-generated for the developer, and are generally restricted to generating generic "barebone" application source code.

Accordingly, there remains a need in the art for an IDE tool that provides for extensible rapid application development for disparate data sources.

SUMMARY OF THE INVENTION

One embodiment of the invention includes a computer-implemented method for generating application source code or development project artifacts for a software development project. The method generally includes receiving, from a user interacting with an integrated development environment (IDE) tool, a selection of an input resource, parsing the input resource to identify a resource type of the input resource, and generating a collection of template-input data from the input resource based on the resource type and content of the input resource. The method also includes identifying a template corresponding to the resource type, wherein the template specifies an output resource type that may be generated from the template, generating content of the output resource, based on the template and the template-input data, and storing the content of the output resource within a project file associated with the development project.

Another embodiment of the invention includes a computer program product comprising a computer useable medium having a computer readable program, wherein the computer readable program, when executed on a computer causes the computer to perform an operation for generating application source code or development project artifacts for a software development project. The operation generally includes receiving a selection of an input resource, parsing the input resource to identify a resource type of the input resource, and generating a collection of template-input data from the input resource, based on the resource type and content of the input resource, The operation also includes identifying a template corresponding to the resource type, wherein the template specifies an output resource type that may be generated from the template, generating content of the output resource, based on the template and the template-input data, and storing the content of the output resource within a project file associated with the development project.

Still another embodiment of the invention includes a system having a processor and a memory containing an integrated development environment (IDE) tool, which when executed on the processor, is configured to generate application source code or development project artifacts for a software development project by performing an operation. The operation may generally include, receiving, from a user interacting with the IDE tool, a selection of an input resource, parsing the input resource to identify a resource type of the input resource, and generating a collection of template-input data from the input resource, based on the resource type and content of the input resource. The operation may generally further include identifying a template corresponding to the resource type, wherein the template specifies an output resource type that may be generated from the template, generating content of the output resource, based on the template and the template-input data, and storing the content of the output resource within a project file associated with the development project.

Still another embodiment of the invention provides a method for generating a generic service configuration template used to create a collection of localized configuration files for a distributed application. The method generally includes receiving a set of service parameters associated with the distributed application, generating, based on the set of service parameters, a generic service configuration template, and storing the generic service configuration template. The generic service configuration template may include one or more extensible style language transforms (XSLTs) used to generate a collection of localized configuration files for a given application server.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
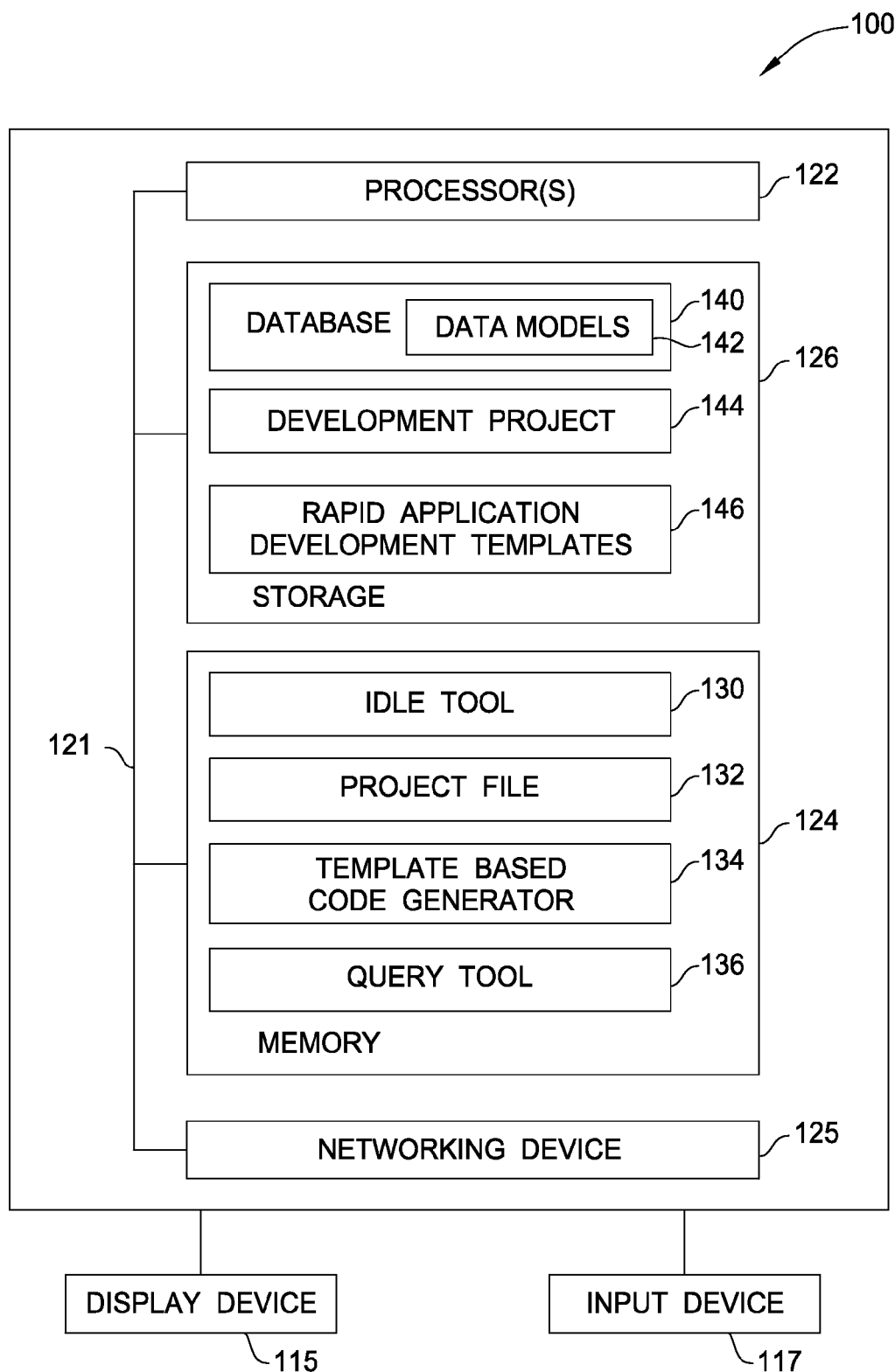
FIG. 1 illustrates an exemplary computing system, according to one embodiment of the invention.

Embodiments of the invention provide an IDE tool that provides rapid application development templates for a variety of disparate data sources. Developers may customize and extend the rapid application development templates to suit their development needs in a particular case. In one embodiment, the developer may use a variety of input resources as metadata to generate application source code (or other artifacts) for an application development project. What content actually gets generated depends on the input resources as well as a rapid application development template used to process the input metadata. By customizing the template to process different input resources and customizing what application source code (or other artifacts) may be generated for a given set of input resources the resulting application source code may be built from and for heterogeneous and disparate data sources in a seamless fashion. Further, developers do not need to rely on upgrades to the IDE tool in order to change what application source code (or other development artifacts) are generated from a given input resource. Thus, embodiments of the invention provides an efficient and flexible framework for generating application source code that is fully customizable, greatly reducing cost and giving power to developers using the IDE tool. Additionally, in a particular embodiment, a generic service configuration template may be used to generate a set of localized configuration files used to deploy a "lightweight" application, such as a web-service, to a particular application server.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drives) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, some embodiments of the invention are described herein relative to an IDE tool configured for extensible rapid application development using the Java® programming language that includes embedded SQL statements and uses other known constructs and artifacts related to the Java® programming language. One of ordinary skill in the art will readily recognize, however, that embodiments of the invention may be adapted for use with a wide variety of programming languages used to develop software applications. Similarly, embodiments of the invention may be adapted for use with other database query languages. Also similarly, embodiments of the invention are described herein adapted for use with the widely used XML markup language. However, the invention is not limited to the XML markup language; rather, embodiments of the invention may be adapted to other markup languages or other data object formats or data representations, whether now known or later developed.

FIG. 1 is a block diagram that illustrates an example view of a computing environment 100, according to one embodiment of the invention. As shown, computing environment 100 includes computer system 120. Computer system 120 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 120 is simplified to highlight aspects of the present invention and that computing systems and data communication networks typically include a variety of additional elements not shown in FIG. 1.

As shown, computer system 120 includes a processor (or processors) 122, a storage device 124, a networking device 125, and a memory 126, connected by a bus 121. CPU 122 is a programmable logic device that executes user applications (e.g., an IDE tool 130). Computer system 120 may be connected to a display device 115 and to user input devices 117. Typically, user input devices 117 include a mouse pointing device and a keyboard, and display device 115 is a CRT monitor or LCD display. Additionally, the processing activity and hardware resources on computer system 120 may be managed by an operating system (not shown). Well known examples of operating systems include the Windows® operating system, distributions of the Linux® operating system, and IBM's i5/OS® operating system, among others. (Linux is a trademark of Linus Torvalds in the US, other countries, or both). Network device 125 may connect computer system 120 to any kind of data communications network, including both wired and wireless networks.

Storage device 126 stores application programs and data for use by computer system 120. Typical storage devices include hard-disk drives, flash memory devices, optical media, network and virtual storage devices, and the like. As shown, storage device 126 contains a database 140 and a development project 144. Database 140 may store a collection of data records organized according to a data model 142. For example, data model 142 may provide a relational schema of tables columns, and keys for organizing data records stored in database 140 and accessed using SQL database statements. Development project 144 represents a collection of information used to build a software application. For example, development project 144 may include source code files, resource scripts, etc., along with resources such as fonts, images, build-instructions and project documentation, etc.

As shown, memory 124 stores a number of software applications, including an IDE tool 130, a template-based generation tool 134, and a query tool 136. Although shown as separate components for clarity, one of skill in the art will recognize that these components may be combined into a single application package. Also as shown, memory 124 includes a project file 132.

Generally, IDE tool 130 provides a software application used to develop other software applications. IDE tool 130 may include an editor, a compiler and other useful software tools. Project file 132 represents a file included in development project 144 that is being edited by a developer using IDE tool 130, e.g., a source code file or other application artifact used to build an executable software application. IDE tool 130 may display the content of project file 132 on display device 115 and provide an interface that allows the user to edit that content.

In one embodiment, IDE tool 130 is configured to interact with template-based generation tool 134 to generate application source code (or other artifacts) for a software application (represented by development project 144). For example, in one embodiment, template-based generation tool 134 may be configured to generate application source code (or other artifacts) based on an existing database schema, existing source code (e.g., a Java® model, interface or bean model) using one of rapid application development templates 146. The particular queries, objects, methods, or other source code generated by the template-based generation tool 134 may be specified by a rapid application development template 146. Further, IDE tool 130 may provide a plurality of development templates 146, where a developer may extend, customize, and control what input data is recognized by given template 146, as well as what application source code (or other artifacts) are generated for that template 146 and a given set of input data.

For example, template-based generation tool 134 may use data model 142 and a corresponding rapid application development template 146 to generate application source code that encapsulates database statements used to create new records and to retrieve, update, and/or delete existing records from database 140. Further, IDE tool 130 may generate all of the necessary source code needed by the developer to invoke these operations from within application source code (e.g., a collection of Java® methods exposed through an interface provided by a Java® bean object). The generated application source code may be stored in an existing projecting file 132 or written to a new project file 132. As another example, template-based generation tool 134 may be configured to generate application code source using an existing database query and a corresponding rapid application development template 146. Building an application for a known, often highly-customized and complex database query, is a common task performed by a software developer. In such a case, the query itself may be a combination of various languages (e.g., SQL, Xquery, or other query language). Additional scenarios for both input data sources, rapid application development templates 146, and generated application source code (or other artifacts) are described below.

Figure 2:
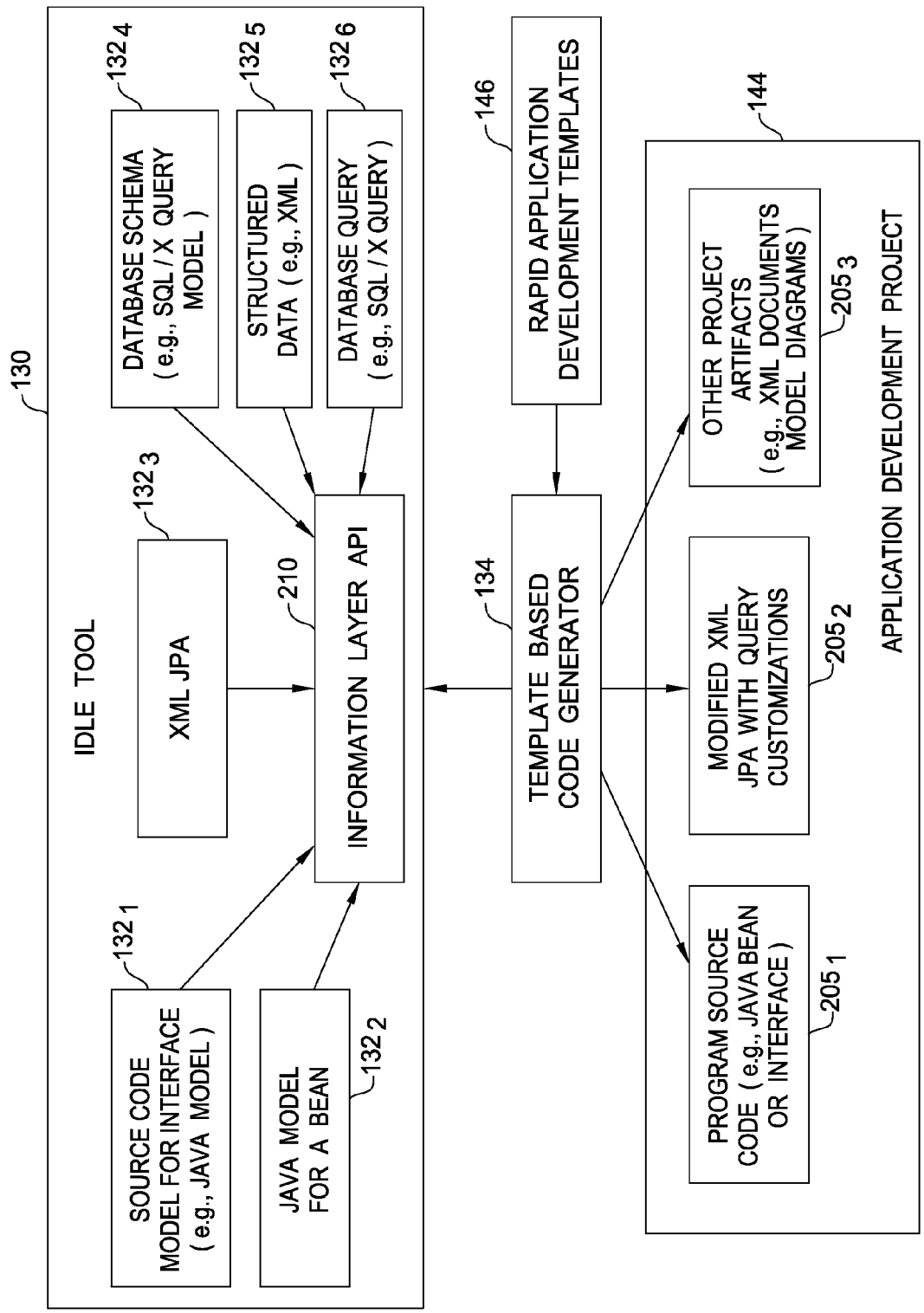
FIG. 2 is a conceptual illustration of an IDE tool, a template-based code generation tool, and development templates configured for rapid application development for disparate data sources, according to one embodiment of the invention.

FIG. 2 is a conceptual illustration of IDE tool 130, template-based generation tool 134, and development templates 146 configured for rapid application development for disparate data sources, according to one embodiment of the invention. As shown, IDE tool 130 may access a variety of different types of project files $132_{1-5}$. Illustratively, project file $132_1$ represents a source code file or model, such as a Java® model or interface. Project file $132_2$ represents another example of a Java® model, in this case, a model for a bean object. Project file $132_3$ represents an XML JPA file. As is known, XML JPA (Java Persistence API) defines an interface to persist normal Java® objects to a data store, such as relational database. Project file $132_4$ represents a database schema (e.g., an SQL/Xquery model). Project file $132_5$ represents a structured data file (e.g., an XML document). Finally, project file $132_6$ represents an existing database query (e.g., an SQL/Xquery). In different embodiments, any of the data sources represented by project files $132_{1-5}$ may be accepted as metadata input to template-based generation tool 134 to generate application source code or other artifacts. Of course, other input resources may be used to suit the needs of a particular case.

In one embodiment, IDE tool 130 may externalize data from any of project files $132_{1-6}$ via an information layer API 210. For example, information layer API 210 may parse one of project files $132_{1-6}$ and generate a normalized set of information passed to template-based generation tool 134. Thus, information layer API 210 may provide a unified facade to access information from one of project files $132_{1-6}$ in a consistent manner, regardless of the form of input data or which project file is used. Template-based generation tool 134 may then use the input data and one of rapid application development templates 146 to generate application source code (or other artifacts) stored in development project 144. As shown, for example, application development project 144 includes a variety of different objects output by template-based generation tool 134. Illustratively, generated file $205_1$ represents application source code in a given programming language, e.g., a Java® source code file, interface, or jar, generated file $205_2$ represents a modified XML JPA with query customizations, and generated file $205_3$ represents any other project artifacts such as an XML document, a model diagram representing a database schema generated from application source code, an interface definition for a Java® object, database creation statements (e.g., DDL create statements) or other development artifacts.

As stated, the actual content of one of generated files $205_{1-3}$ produced by template-based generation tool 134 for a given set of input resources may be specified by one of rapid application development templates 146. Furthermore, in one embodiment, users may customize, extend and/or create rapid application development templates 146 using the information layer API 210 to generate additional artifacts of their choice or customize existing artifacts. Such customizations, when building database applications for example, could include SQL customizations for different versions of a database, different database schemas or even different vendor's database products (e.g., to generate application source code or custom SQL with vendor specific concurrency code), or to generate additional artifacts from existing data inputs that the tool does not ship out of the box.

Thus, embodiments of the invention may be adapted for use with a wide variety of project files 132 to generate a broad variety of generated objects 205. The following discussion describes a number of different scenarios related to building a database-aware application as an example to illustrate the flexibility and extensibility of the rapid-application development templates 146 and template-based generation tool 134.

In one embodiment, an application may be generated for an existing database, where the template generation tool 134 generates application source code based on the Java® programming language that may be used to access the existing database. That is, application generation may progress "bottom up" from the existing database. In such a case, a database application may be generated for elements of the existing database, e.g., a table or view defined by the existing database. Input metadata may be represented in the form of a live database connection, a model diagram describing the database schema (i.e., project file $132_4$) or an xml file defining the schema (i.e. project file $132_5$). IDE tool 130 may convert this input information into a form used by the information layer API 134. For example, information layer API 210 layer may provide information such as table names, column names, primary keys and other constraints to template based generation tool 134.

A rapid application development template 146 provided for this type of input information may generate application source code for a database-aware application. For example, the content generated by template-based generation tool 134 may include source code to perform create, retrieve, update, and delete SQL statements relative to the existing database, table, or column, along with the application logic needed to execute and consume the results of these queries. In one embodiment, the rapid application development template 146 is provided to developers as part of IDE tool 130, and accordingly, developers may use the template 146 as a starting point and may change or add new templates, extending what source code is generated to suit their needs in a particular case.

Another example includes generating a Java® source code for a database-aware application from an existing SQL or Xquery query (i.e., project file $132_6$). In such a case, the query could access a data source such a database, objects in a file system, or a combination of both. The template-based generation tool 134 may consume information generated by the information layer API 210 about the data source model (i.e., the database schema underlying the query) to generate source code for an application around the query. Further, if the query includes other elements (e.g., Java® host variables), then knowledge of the java model (e.g., project file $132_{1-2}$) or the source program containing the query is also provided to the template-based generation tool 134 by the information layer API 210.

A rapid application development template 146 provided for this type of input information passed from the information layer API 210 to determine an appropriate Java® bean structure to store query results for the input query. Like the previous example, a developer may use default templates 146 provided with IDE 130 or provide their own structure in the form of source code, model diagrams, or XML documents, etc. This information is then used by template generation tool 146 to generate the source code used by the result set Java® beans to store query results.

Another example of rapid-application development using extensible templates begins from the other direction. That is, an application may be generated "top down" by starting from a Java® object model and source code (project file 1321-2). This is a common task engaged in by developers. In such a case, the underlying database may do not exist; and instead, the template based generation tool 134 may recommend the database object creation scripts (DDL) (i.e., an example of generated file 2053) based on the input Java® object model. Further, in such a case, the database schema (represented by the database object creation scripts) may be created and/or deployed at the time of application deployment. This allows developing applications in a fashion disconnected from the deployment infrastructure.

Like the "bottom up" examples discussed above, a default rapid application development template 146 may be used on this input data to generate application source code (or other artifacts). Thus, in this example, the template based generation tool 134 may generate Java® beans representing database schemas and application source code to encapsulate statements on the database. Further, providing developers with the ability to customize the templates used to generate the Java® beans and database program makes this a powerful feature and provides a significant productivity boost.

Moreover, in each of the above example scenarios, irrespective of the form of input resource that is used (i.e., regardless of what project files $132_{1-5}$ or other input resource), the template based generation tool 134 may be configured to generate a variety of output resources, such as application code and/or other related application development artifacts based on rapid application development templates 146. By supporting rapid application development for disparate data sources using customizable templates, embodiments of the invention may be used to provide developers with a rapid application development tool that may be used for the broad variety of scenarios that occur in practice.

Figure 3:
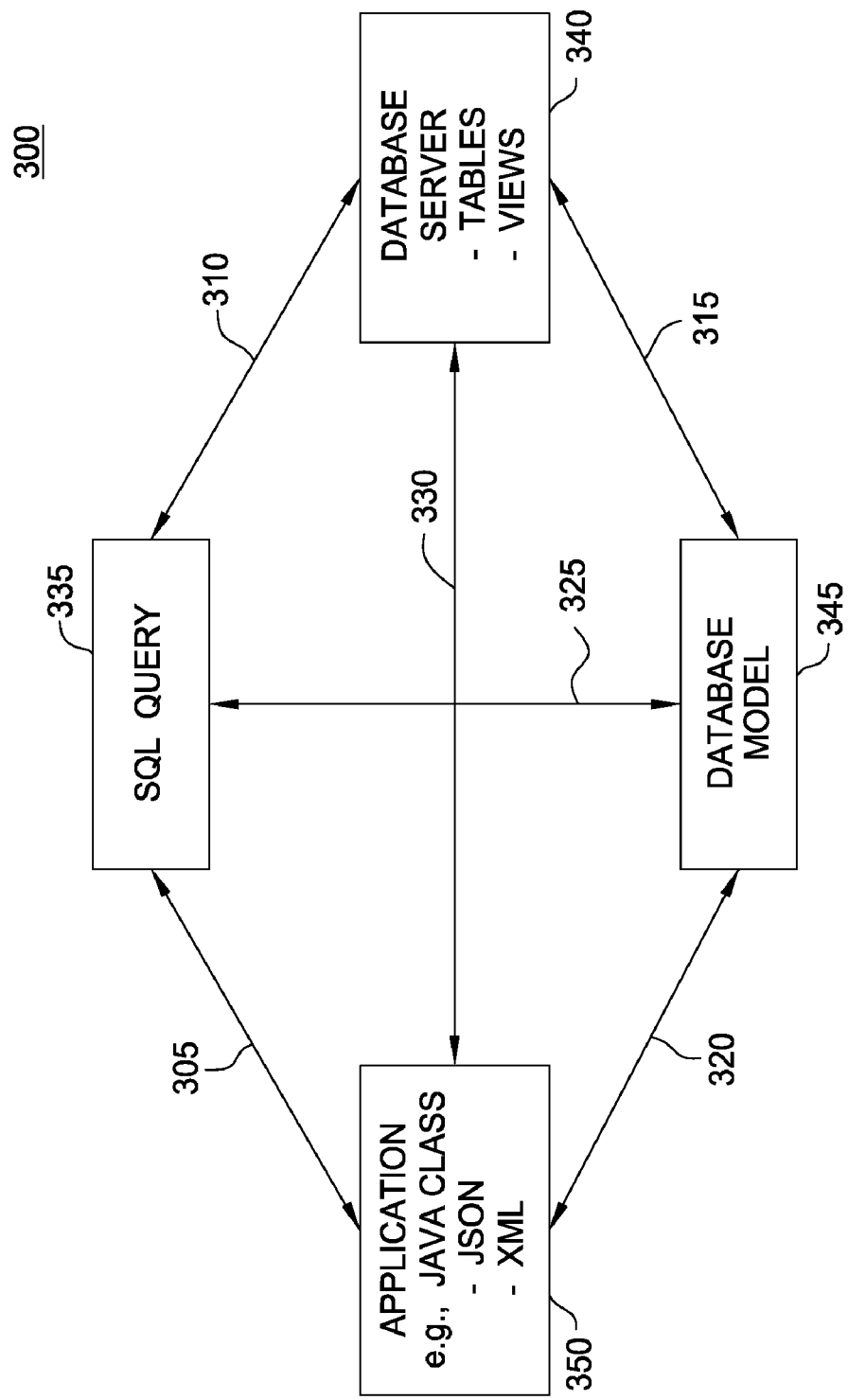
FIG. 3 further illustrates a variety of development scenarios for extensible rapid application development from disparate data sources, according to one embodiment of the invention.

FIG. 3 further illustrates a variety of development scenarios for extensible rapid application development from disparate data sources supported by embodiments of the present invention. As shown, arrows 305, 310, 315, and 320, represent the use of an input data element (one of data sources at 335, 340, 345, and 350) that is supplied to the template-based generation tool 134. In turn, the template-based generation tool 134 may generate an output data element (also one of data sources at 335, 340, 345, and 350), as specified by one of the rapid-application development templates 146. In one embodiment, what is generated by the rapid application development tool 134 may be customized based on the content of a template supplied to the template-based generation tool 134 for a given input data element.

Illustratively, in one direction, arrow 305 represents generating application source code from an SQL query. In such a scenario, application source code may be Java® source code, C, C++, or C# source code, an XML file or a JSON (JavaScript Object Notation) file, or the source code of another programming language, as examples. Conversely, in the other direction, arrow 305 represents any of these types of application source code used to generate SQL queries.

Similarly, in one direction, arrow 310 represents generating SQL queries from database catalogs. In such a scenario, a representation of database catalog information is provided by the information API layer 210 and used to generate SQL statements via a corresponding rapid application development template 146. In the other direction, arrow 310 represents generating a database catalog from a supplied SQL query or other database statement. In such a scenario, the SQL query may be used to generate database catalog information or a database schema, such as a collection of database creation scripts.

In one direction, arrow 315 represents generating development artifacts, such as a database model, from a database catalog. For example, in one embodiment, a database model may be generated for use with the popular IBM Rational Software Architect application. Another example includes generating a class diagram or object hierarchy from a database catalog. Conversely, in the other direction, arrow 315 representing a database catalog being generated from such a database model.

In one direction, arrow 320 represents generating a database model from application source code, such as Java® source code, C, C++, or C# source code, an XML file or a JSON file, or the source code of another programming language. In such a case, starting from an input set of application source code, information layer API 210 may provide this information to the template-based generation tool 134 in a unified manner. Template-based generation tool 134 may then use the information provided by the information layer API 210 to generate a development artifact representing a logical or physical database model. For example, the template-based generation tool 134 may generate a database model used in the IBM Rational Software Architect application. Conversely, in the other direction, arrow 320 represents generating application source code from a database model (or other development artifact). Arrows 325 and 330 represent additional combinations the input and output resources (i.e., combinations of the data sources at 335, 340, 345, and 350) that may be used to generate application source code or other development artifacts.

Figure 4:
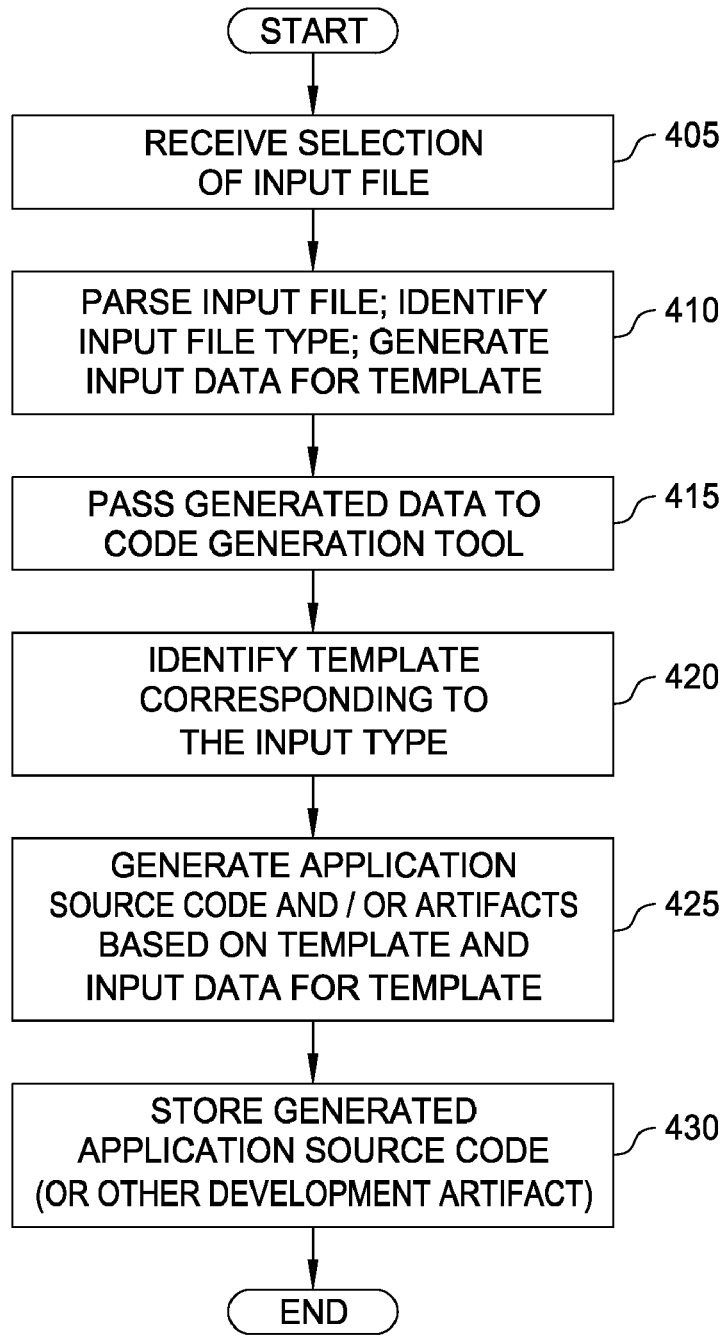
FIG. 4 illustrates a method for rapid application development for disparate data sources, according to one embodiment of the invention.

FIG. 4 illustrates a method 400 for rapid application development for disparate data sources, according to one embodiment of the invention. As shown, method 400 begins at step 405, where IDE tool 130 receives a selection of an input file. For example, FIGS. 2 and 3, above, illustrate a variety of different development project files 132 that may be used to generate an application, application source code, or other development artifact.

At step 410, the input file is parsed to identify an input file type (e.g., a Java® source code file, an SQL query, or a database model). Based on the input file type, IDE tool 130 may retrieve the appropriate information therefrom (e.g., Java® host variables for the Java source code file, query elements for the SQL query, or tables and columns of the database model).

At step 415, the data retrieved from the input file is passed to the template-based generation tool 134. At step 420, template-based generation tool 134 may identify the appropriate rapid development template 146, based on the input file type. Alternatively, the developer may specify a specific development template to use. For example, a developer may have multiple application templates that may be used for a particular input type or the developer may have customized what is generated by a default rapid application development template. At step 425, the template-based generation tool 134 may generate a resource for a development project based on the template identified at step 420 and the data retrieved from the input file at step 410. For example, as described above in conjunction with FIGS. 2 and 3, the development resource generated by template-based generation tool 134 may be an application, application source code, a source code model (e.g., a Java® bean model or Java® interface definition), and the like. Other development resources generated by template-based generation tool may include development artifacts such as an SQL query, DDL scripts, class or model diagrams etc.

As described, embodiments of the invention provide an IDE tool used for rapid application development based on a variety of disparate data sources and extensible application development templates. Additionally, in one embodiment, the rapid application development tool may be used to generate service configuration data and or files used to localize a generic service configuration template for a broad variety of deployment environments (e.g., for different application servers). In particular, the template-based generation tool may be used to create configuration files or other development, application or deployment artifacts for more "lightweight" software applications such as a web-service. As is known, a web-service generally refers to any piece of software that makes itself available over a network (e.g., the Internet) often using a standardized (usually XML) messaging system. Web-services generally include a mechanism for interested parties to locate the service and an associated public interface. The most prominent directory of web-services is currently available via UDDI, or Universal Description, Discovery, and Integration.

Even though web-services may be developed according to common standards, application server vendors often differ in how web-services are deployed on their products, or may provide different extensions or additions to an underlying standard to differentiate their products from that of other vendors. Frequently, however, this creates problems for an application developer, as the developer needs to create working configuration files or other application components or deployment files for each different application server vendors.

To address this issue, IDE tool 130 may be configured to create a framework for a web-service or some other distributed application type. In one embodiment, IDE tool 130 may be configured to generate a common (i.e., runtime independent) configuration file describing the web-service, referred to as a generic service configuration template. This may be done by prompting for user input to describe different aspects of the service implementation. For example, assume that the developer desires to expose (one or more) SQL statements or stored procedure as operations in a web service. In such a case, the developer may interact with IDE tool 130 to compose the SQL statements. In one embodiment, IDE tool 130 may facilitate this process by providing a query builder tool (which provides syntax highlighting, parsing, testing facilities) or even a routine development environment to develop server-side routines (like stored procedures or UDFs which get deployed on the database server and may be exposed later on as Web services).

Additionally, the developer specifies a name which may be used to identify each SQL statement (or other resource) included in the web service. In one embodiment, IDE tool 130 may be configured to vet the statement for syntactical and semantic correctness. The developer may be prompted to provide additional information (e.g., deployment environment information, service bindings, etc.).

After prompting the developer to supply this information, IDE tool 130 may generate a description of the information provided by the developer. For example, IDE tool 130 may generate a generic service configuration template (e.g., an XML document) that includes the query statement (or statements), the statement metadata, and any additional developer input.

Further, once generated, the generic service configuration template may be used to create localized configuration files used to deploy a web-service on a variety of application servers. In this embodiment, the generic service configuration template may include one or more extensible style language transforms (XSLTs) used to localize the generic service configuration template for a particular application server. As is known, an XSLT is used to transform an input XML document into another XML document, according to an XSL transform.

Figure 5:
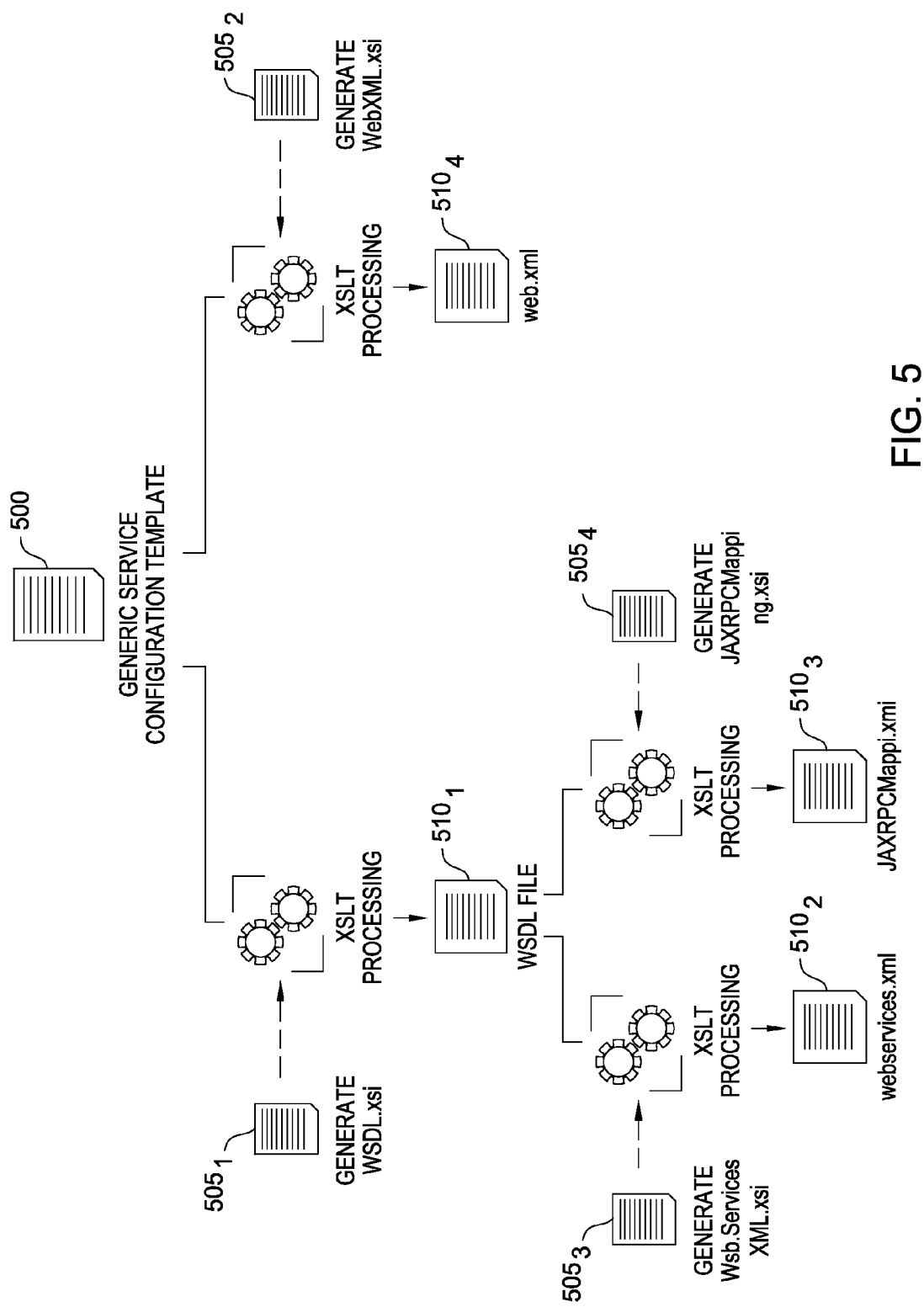
FIGS. 5 and 6 are conceptual illustrations of an embodiment of the invention used to create a framework for a web-service from metadata.
Figure 6:
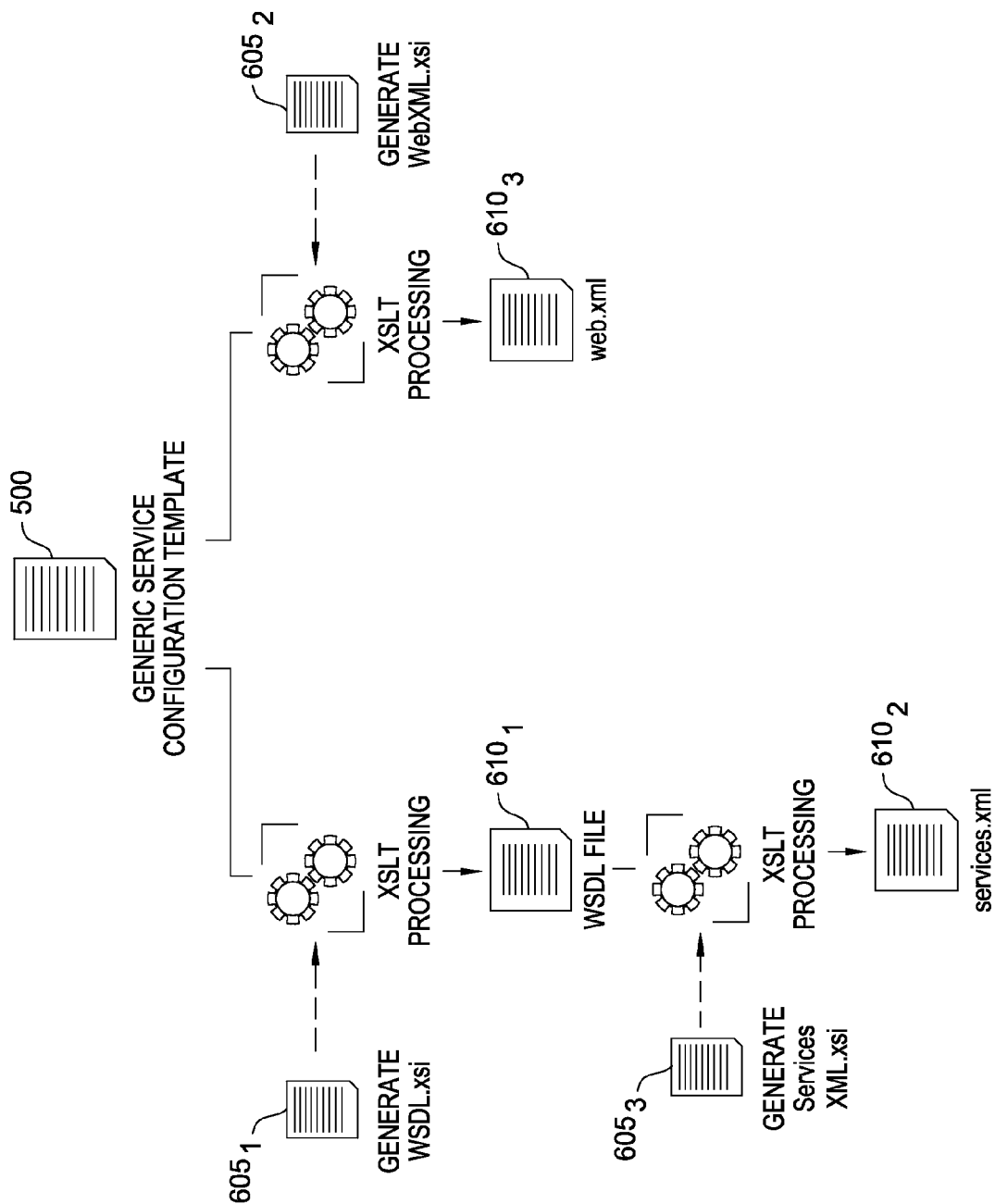

FIGS. 5 and 6 are conceptual illustrations of an embodiment of the invention used to create a framework for a web-service from a generic service configuration template. More specifically, FIG. 5 illustrates a collection of runtime configuration files generated from a generic service configuration for a JSR-109 complaint application server. And in contrast, FIG. 6 illustrates a collection of runtime configuration files generated from the same generic service configuration for an Axis-2 complaint application server. As is known, JSR-109 provides a community-developed standard web-service framework managed by Sun Microsystems®, and Axis-2 is an open source, XML based Web service framework developed at the direction of the Apache® software foundation. While both a JSR-109 and an Axis-2 compliant application server provides a framework for web-services, the configuration files needed to deploy a given web-service to one of these application servers differs from one another. Similarly, other commercially available application servers also require their own particular collection of deployment and configuration files.

As shown in FIG. 5, a generic service configuration template 500 includes a collection of XSLTs $505_1$, $505_2$, and $505_3$ used to localize the generic service configuration template 500 for a JSR-109 compliant application server. The output XML documents generated by XSLTs $505_1$, $505_2$, and $505_3$ include a "WSDL" file $510_1$ a "JAXRPCMapping.xml" file $510_2$, a "webserivces.xml" document file $510_3$, and a "web.xml" file $510_4$. Each of files $510_{1-4}$ may be necessary to deploy a given web-service to a JSR-109 complaint application server.

Similarly, as shown in FIG. 6, generic service configuration template 500 includes a collection of XSLTs $605_1$, $605_2$, and $605_3$ used to localize generic service configuration template 500 for an application server. However, in contrast to FIG. 5, XSLTs $605_1$, $605_2$, and $605_3$ may be used to localize generic service configuration template 500 for an Axis-2 compliant application server. Specifically, a "generateWSDL.xsl" XSLT $605_1$ is used to create a "WSDL" file $610_1$. Additionally, a "generateServicesXML.xsl" XSLT $605_3$ is used to process "WSDL" file $610_1$ and generate a "services.xml" file $610_2$. Also, "generateWebXML.xsl" XSLT $605_2$ is used to create a "web.xml" file $610_3$ from generic service configuration template 500.

Thus, in either of the scenarios illustrated in FIGS. 5 and 6, the common generic service configuration template may be localized as needed for different application servers. Advantageously, using generic service configuration template frees the developer from having to repackage configuration files for each different application server. Further, as new application servers become available (or existing ones are updated with new standards extensions or capabilities), the developer need only up date the XSLTs used to localize the generic service configuration template for an existing, or update the generic service configuration template with new XSLTs, as appropriate.

More generally, embodiments of the invention provide a framework for generating application source code (or other development artifacts) using an extensible collection of rapid-application development templates. In one embodiment, the developer may use a variety of input sources as metadata to generate the application source code (or other development artifacts) for an application development project. Further, developers may customize and extend the rapid application development templates to suit their needs in a particular case While the foregoing is directed to embodiments of the present invention, other and further embodiments of the invention may be devised without departing from the basic scope thereof, and the scope thereof is determined by the claims that follow.

What is claimed is:

1. A computer-implemented method for generating resource content for a software development project, comprising:
in response to receiving a selection of an input resource from a plurality of resources, parsing the input resource to determine a resource type from a plurality of resource types that corresponds to the input resource wherein the selection is made from an integrated development environment (IDE) tool;
generating template-input data based on the determined resource type and content of the input resource;

identifying a template corresponding to the determined resource type, wherein the template specifies an output resource type be generated from the template; and generating, by operation of one or more computer processors, content of an output resource, based on the output resource type, the template and the template-input data.

2. A computer program product comprising a computer useable storage medium containing a computer readable program, wherein the computer readable program, when executed on a computer, causes the computer to perform an operation for generating application source code or development project artifacts for a software development project, the operation comprising:

in response to receiving a selection of an input resource from a plurality of resources, parsing the input resource to determine a resource type from a plurality of resource types that corresponds to the input resource, wherein the selection is made from an integrated development environment (IDE) tool;

generating template-input data based on the determined resource type and content of the input resource;

identifying a template corresponding to the determined resource type, wherein the template specifies an output resource type be generated from the template; and generating content of an output resource, based on the output resource type, the template and the template-input data.

3. A system, comprising:

a processor; and a memory containing an integrated development environment (IDE) tool, which when executed on the processor, is configured to generate application source code or development project artifacts for a software development project by performing an operation, comprising:

in response to receiving a selection of an input resource from a plurality of resources, parsing the input resource to determine a resource type from a plurality of resource types that corresponds to the input resource wherein the selection is made from an integrated development environment (IDE) tool;

generating template-input data based on the determined resource type and content of the input resource;

identifying a template corresponding to the determined resource type, wherein the template specifies an output resource type be generated from the template; and generating content of an output resource, based on the output resource type, the template and the template-input data.

4. The method of claim 1, wherein the input resource is a database query, and wherein generating content of the output resource comprises:

generating application source code configured to invoke the database query and to store a result from invoking the database query.

5. The method of claim 1, wherein at least one of the input resource and the output resource is one of a Java® source code file, an XML JPA object, an SQL database query, a Java model, a database schema, and a JSON file.

6. The method of claim 1, wherein the template is customizable using the IDE tool.

7. The method of claim 1, wherein the template is a generic services configuration template, and wherein the output resource comprises a plurality of configuration files localized for a given application server.

8. The method of claim 7, wherein the generic services configuration template includes at least one extensible style language transform (XSLT), used to generate the plurality of configuration files for the given application server.

9. The method of claim 1, further comprising:

storing the content of the output resource within a project file associated with the development project.

10. A computer program product comprising a computer useable storage medium containing a computer readable program, wherein the computer readable program, when executed on a computer, causes the computer to perform an operation for generating application source code or development project artifacts for a software development project, the operation comprising:

in response to receiving a selection of an input resource the selection made from an integrated development environment (IDE) tool, determining a resource type of the input resource from two or more types of resource types;

generating template-input data based on the determined resource type and content of the input resource;

identifying a template corresponding to the determined resource type, wherein the template specifies an output resource type that may be generated from the template; and generating content of an output resource, based on the output resource type, the template and the template-input data.

11. The computer program product of claim 10, wherein the input resource is a database model, and wherein generating content of the output resource comprises:

generating at least one database statement to access a database represented by the database model; and encapsulating the at least one database statement within application source code.

12. The computer program product of claim 10, wherein the input resource is application source code referencing that includes at least one database statement, and wherein generating content of the output resource comprises:

generating at least one of a database creation statement and a database schema corresponding to the database statement.

13. The computer program product of claim 10, wherein the input resource is a database query, and wherein generating content of the output resource comprises:

generating application source code configured to invoke the database query and to store a result from invoking the database query.

14. The computer program product of claim 10, wherein at least one of the input resource and the output resource is one of a Java® source code file, an XML JPA object, an SQL database query, a Java model, a database schema, and a JSON file.

15. The computer program product of claim 10, wherein the template is customizable using the IDE tool.

16. The computer program product of claim 10, wherein the template is a generic services configuration template, and wherein the output resource comprises a plurality of configuration files localized for a given application server.

17. The computer program product of claim 16, wherein the generic services configuration template includes at least one extensible style language transform (XSLT), used to generate the plurality of configuration files for the given application server.

18. A system, comprising:

a processor; and a memory containing an integrated development environment (IDE) tool, which when executed on the processor, is configured to generate application source code or development project artifacts for a software development project by performing an operation, comprising:

in response to receiving a selection of an input resource, the selection made from an integrated development environment (IDE) tool, determining a resource type of the input resource from two or more types of resource types;

generating template-input data based on the determined resource type and content of the input resource;

identifying a template corresponding to the determined resource type, wherein the template specifies an output resource type be generated from the template; and generating content of an output resource, based on the output resource type, the template and the template-input data.

19. The system of claim 18, wherein the input resource is a database model, and wherein generating content of the output resource comprises:

generating at least one database statement to access a database represented by the database model; and encapsulating the at least one database statement within application source code.

20. The system of claim 18, wherein the input resource is application source code referencing that includes at least one database statement, and wherein generating content of the output resource comprises:

generating at least one of a database creation statement and a database schema corresponding to the database statement.

21. The system of claim 18, wherein the input resource is a database query, and wherein generating content of the output resource comprises:

generating application source code configured to invoke the database query and to store a result from invoking the database query.

22. The system of claim 18, wherein at least one of the input resource and the output resource is one of a Java® source code file, an XML JPA object, an SQL database query, a Java model, a database schema, and a JSON file.

23. The system of claim 18, wherein the template is customizable using the IDE tool.

24. The system of claim 18, wherein the template is a generic services configuration template, and wherein the output resource comprises a plurality of configuration files localized for a given application server.

25. The system of claim 24, wherein the generic services configuration template includes at least one extensible style language transform (XSLT), used to generate the plurality of configuration files for the given application server.

* * * * *